(12) United States Patent  (10) Patent No.: US 8,305,385 B2
Jani et al.  (45) Date of Patent: Nov. 6, 2012

(54) DISPLAY DEVICE WITH EMBEDDED NETWORKING CAPABILITY

(75) Inventors: Umesh G Jani, Plano, TX (US); Anne E French, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 905 days.

(21) Appl. No.: 12/235,617

(22) Filed: Sep. 23, 2008

(65) Prior Publication Data

US 2010/0073387 A1  Mar. 25, 2010

(51) Int. Cl.
G09G 5/36 (2006.01)
G06F 13/14 (2006.01)
(52) U.S. Cl. ........................................ 345/557; 345/519
(58) Field of Classification Search .................. None
See application file for complete search history.

(56) References Cited

U.S. PATENT DOCUMENTS

| | | | |
|---|---|---|---|
| 2002/0196378 A1* | 12/2002 | Slobodin et al. | 348/744 |
| 2003/0024375 A1* | 2/2003 | Sitrick | 84/477 R |
| 2005/0044186 A1* | 2/2005 | Petrisor | 709/219 |
| 2005/0141875 A1* | 6/2005 | Fukushima | 386/94 |
| 2006/0031565 A1* | 2/2006 | Iyer et al. | 709/234 |
| 2006/0203008 A1* | 9/2006 | Hiroshige | 345/619 |
| 2009/0153712 A1* | 6/2009 | Davis | 348/305 |

* cited by examiner

*Primary Examiner* — Joni Richer
*Assistant Examiner* — Michelle Chin
(74) *Attorney, Agent, or Firm* — Warren L. Franz; Wade J. Brady, III; Frederick J. Telecky, Jr.

(57) ABSTRACT

A display device with embedded networking capability is described herein. The display device uses at least a portion of a memory of the display device, the memory of which is used for storing video/image data in the display, to store networking codes for establishing and maintaining the network connection.

14 Claims, 5 Drawing Sheets

DISPLAY DEVICE WITH EMBEDDED NETWORKING CAPABILITY

TECHNICAL FIELD OF THE DISCLOSURE

The technical field of this disclosure relates to the art of display devices, and more particularly to the art of display systems with embedded networking capabilities.

BACKGROUND OF THE DISCLOSURE

In current display industries such as the projector industry, there is a growing demand for providing networking capabilities in display devices while minimizing the overall system cost.

Current display devices are often equipped with an application-specific-integrated-circuit (ASIC) for performing display system control and data processing, such as video, image, and graphics (hereafter video/image) data processing of video/image inputs, a flash-memory for storing system codes and configuration data, and a low-latency memory for storing real-time video/image data (often referred to as video memory). The ASIC typically comprises a microprocessor for executing software codes that are stored in the flash memory or in another low-latency memory. The microprocessor in the ASIC typically has access to a low-latency memory that stores the real-time video/image data.

In general, a low-latency memory is much more expensive than a flash memory; and an on-chip low-latency memory is considerably more expensive than an off-chip low-latency memory. An on-chip memory (e.g. a low-latency memory, a cache, and a flash memory) is referred to as a memory that is embedded within the ASIC; while an off-chip memory is referred to as a memory that is separate from the ASIC.

Adding network capability on a display device designed with existing ASICs is normally accompanied by the addition of another microprocessor, microcontroller, or a signal controller (e.g. a network controller) and low-latency memories to support the necessary networking functionality, which in turn, increases the overall system cost, such as the bill-of-material (BOM) cost, the original-design-manufacture (ODM) cost, and the original-equipment-manufacture (OEM) cost.

Therefore, what is desired is a display device with embedded reliable and robust networking capability at minimized system cost.

SUMMARY

In one example, a method is disclosed herein, the method comprising: providing a display system that comprises an electronic circuit, the electronic circuit comprising a processor and a memory to which the processor has access; displaying an image, comprising: storing a set of data corresponding to an image in the memory; and displaying the image by using the image data stored in the memory; and establishing a network connection, comprising: storing at least a portion of a set of instructions and data for providing networking in at least a portion of said memory; and executing the set of networking codes so as to establish a network connection between the display device and the network.

In another example, a display device is provided, the display device comprising: a control unit, comprising: a memory; a micro-processor having access to the memory; a network interface through which the control unit interfaces a physical layer of a network, wherein the network interface comprises a media-access-control layer; and a set of network codes stored in the memory, wherein the set of networking codes is for establishing a network connection between the control unit and a network; and a display for displaying an image.

In yet another example, a method for operating a display device is disclosed herein, the method comprising: establishing at least a minimal network connection to a network when the display device is powered on, comprising: storing at least a portion of a set of instructions and data for establishing the network connection in at least a portion of a memory; and executing the set of instructions and data so as to establish the network connection between the display device and the network; and entering into a display mode upon receipt of a trigger signal.

DETAILED DESCRIPTION OF SELECTED EXAMPLES

Disclosed herein is a display device with embedded networking capability. The display device is capable of operating in multiple modes, which comprise a normal display mode and a networking mode. In the normal display mode, the display device uses one or more low-latency memories to store video/image data related to videos/images to be displayed; and displays the videos/images. In the networking mode, the display device uses at least a portion of the low-latency memory that is used to store video/image data in the normal display mode, to store and/or execute at least a portion of the instructions and data to establish network connection.

The display device and its operation will be detailed in the following with selected examples. It will be appreciated by those skilled in the art that the following discussion is for demonstration purpose and should not be interpreted as a limitation. Other variations within the scope of this disclosure are also applicable.

Figure 1:
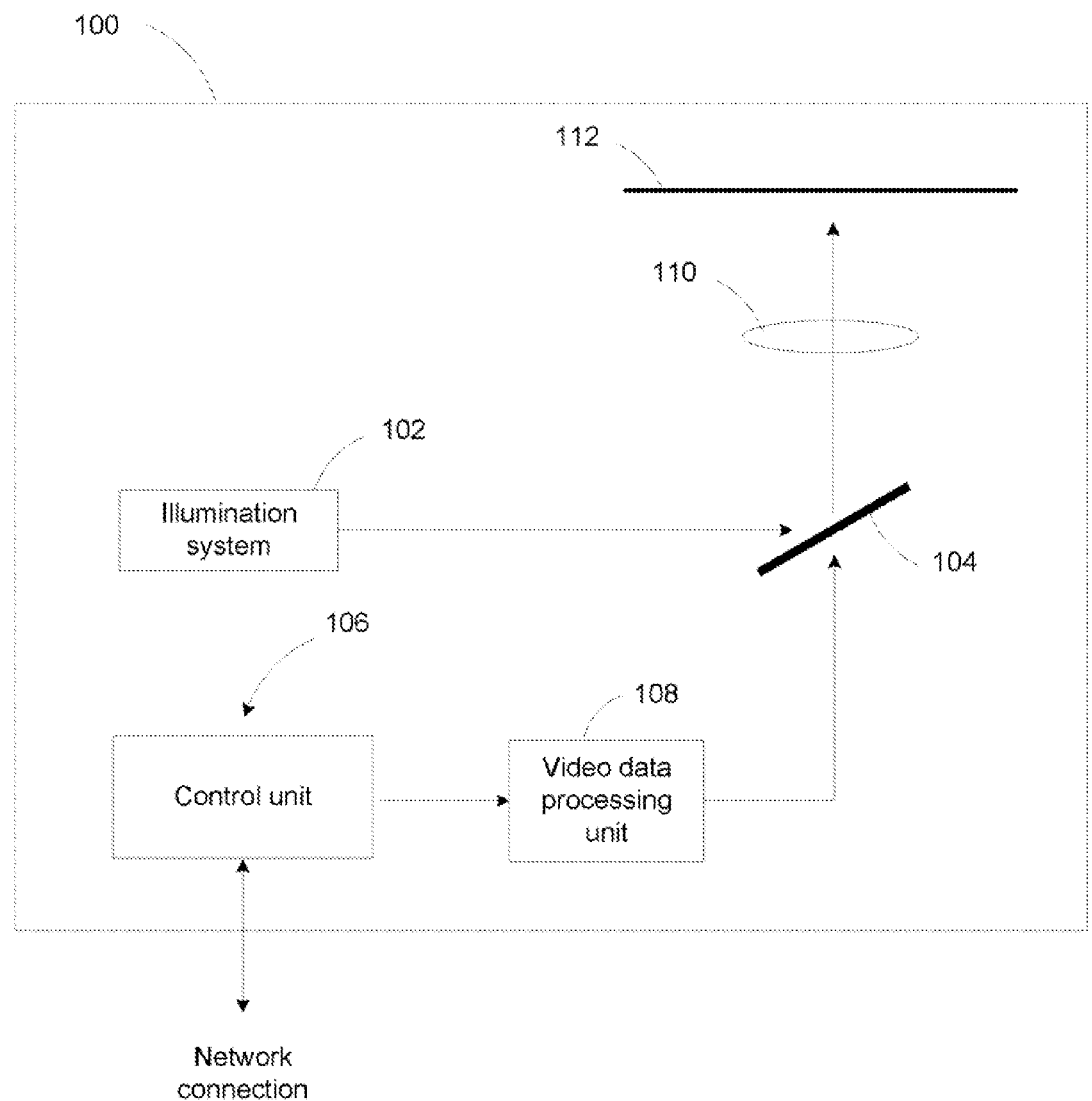
FIG. 1 diagrammatically illustrates the structure of an exemplary display device having embedded networking capability.

Referring to the drawings, FIG. 1 diagrammatically illustrates an exemplary display device with embedded networking capability. Display device 100 in this example comprises illumination system 102, light valve 104, control unit 106, video data processing unit 108, and optics 110. Screen 112 is the display target on which videos/images are to be displayed. The screen may or may not be a member of the display device. In one example, the display device does not have a central-processing-unit (CPU) used in computing device (e.g. personal computers).

Illumination system 102 provides illumination light for the display device. The illumination system may comprise a wide range of light emitting devices, such as lasers, light-emitting-diodes, arc-lamps, devices employing free space or waveguide-confined nonlinear optical conversion, and many other light emitting devices. In particular, the illumination system may comprise illuminators with low etendue, such as solid state light emitting devices (e.g. lasers and light-emitting-diodes (LEDs)).

When solid-state light emitting devices are used, the illumination system may comprise an array of solid-state light emitting devices capable of emitting different colors, such as colors selected from red, green, blue, and white. Because a single solid-state light emitting device generally has a narrow characteristic bandwidth that may not be optimal for use in display systems employing spatial light modulators, multiple solid-state light emitting devices can be used for providing light of each color so as to achieve optimal bandwidth for specific display systems. For example, multiple lasers or LEDs with slightly different characteristic spectra, such as 20 nm or less characteristic wavelength separation, can be used to produce a color light such that the characteristic spectra of the multiple lasers or LEDs together form an optimal spectrum profile of the display system. Exemplary laser sources are vertical cavity surface emitting lasers (VCSEL) and Novalux™ extended cavity surface emitting lasers (NECSEL), or any other suitable laser emitting devices.

The light valve (104) comprises an array of individually addressable pixels, such as micromirrors, liquid-crystal- on-silicon cells, and other suitable devices, such as self-light emitting devices (e.g. plasma cells and organic-light-emitting-diodes). The light valve modulates the incident light based on the image data (e.g. bitplanes) of the desired videos/images; and the modulated light is directed to screen 112 through optics 110.

It is noted that the illumination system (102) may not be necessary when the light valve is comprised of self-light emitting devices. In some other examples such as scanning-display devices wherein videos/images are generated by scanning a display target (e.g. a screen) with light beams from an illumination system, the light valve may not be provided.

The pixels of the light valve are operated in accordance with image data derived from videos/images to be produced. The image data is provided to the light valve by video data processing unit 108. In examples wherein the light valve is not provided in the display device (e.g. scanning display devices), the image data from the video data processing unit (108) can be used to control the light beams scanning the display target.

The display device of FIG. 1 can be various types of display devices, such as projectors, front-projection televisions, flat-panel televisions, or other display systems.

The operation of the device components and the image data processing are controlled by control unit 106. In particular, the control unit (106) controls the display device to be operated in a selected mode (e.g. the normal display mode or the networking mode) and switches the display device between different operation modes. The control unit (106) can be an electronic circuit such as an application-specific-integrated-circuit (ASIC), a field-programmable-gate-array (FPGA), or a digital-signal-processor (DSP). Alternatively, the control unit (106) can be implemented as a set of computer-executable codes stored in a computer-readable storage. For demonstration purpose, FIG. 2 diagrammatically illustrates a portion of an exemplary control unit (106) that is an electronic circuit, such as an ASIC.

Figure 2:
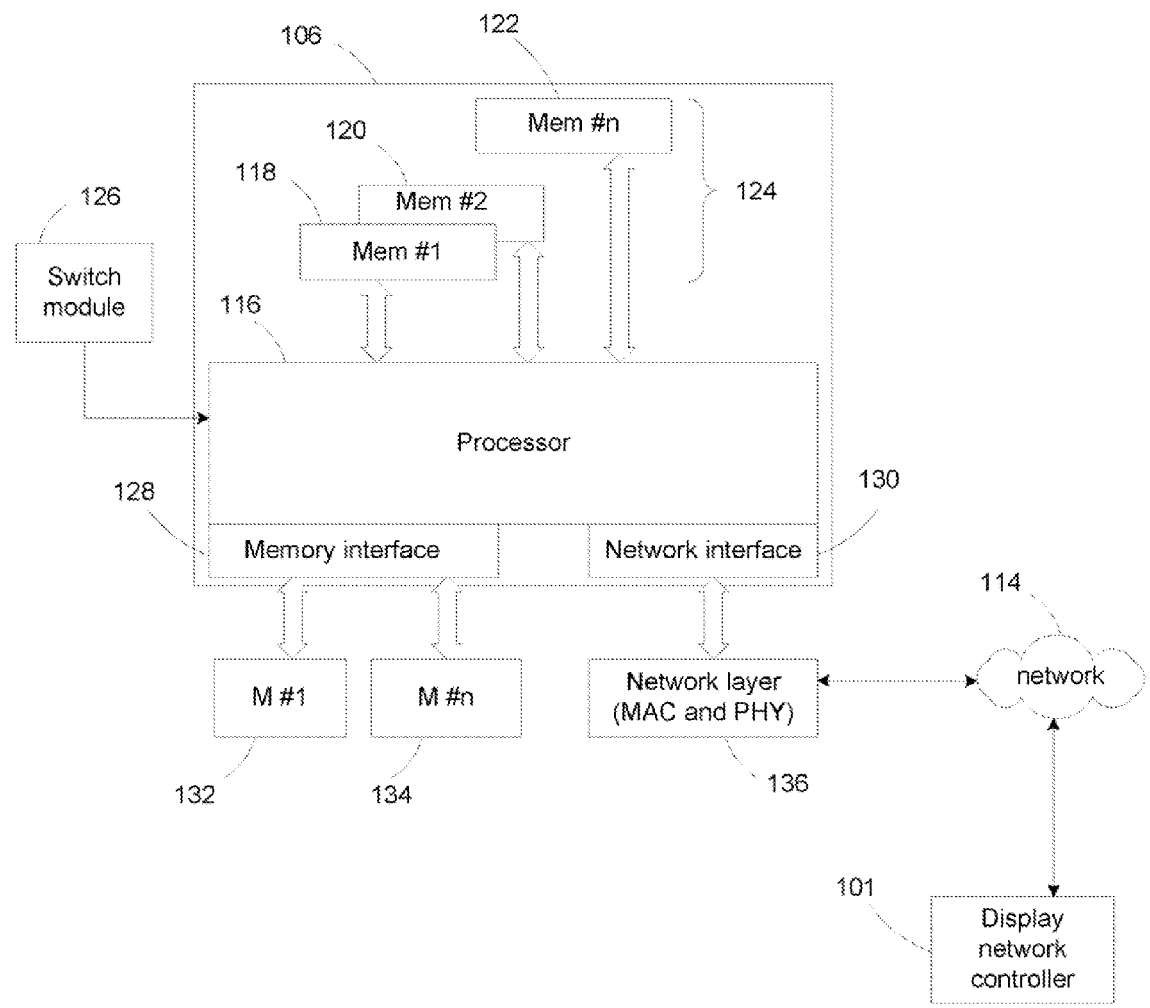
FIG. 2 is a block diagram that schematically illustrates an exemplary control module and selected peripheral devices connected to the control module in the display device in FIG. 1.

Referring to FIG. 2, the control unit (106) in this example comprises processor 116 and on-chip memory set 124 that comprises one or more on-chip low-latency memories, such as mem #1 118, mem #2, 120, and mem #n 122. In one example, the processor (116) has direct access to substantially all on-chip low-latency memories. In another example, the processor has direct access to only a small group of on-chip low-latency memories, especially those on-chip low-latency memories used for storing video/image data (which is often referred to as frame memories).

In other examples, the control unit (106) may comprise multiple processors. In these examples, processor 116 can be the primary processor; and the other processors can be secondary processors. In some examples, the secondary processors may have lower performance than the primary processor.

The control unit (106) can be implemented as an electronic circuit such as an application-specific-integrated-circuit (ASIC) or a field-programmable-gate-array (FPGA). The processor (116) of the control unit is a digital-signal-processor (DSP). For example, the processor (116) can be an ARM9 family processor by ARM such as ARM946, an ARM7 family processor by ARM, or other suitable processors. The on-chip low-latency memories can be standard video memories, or other types of on-chip memories.

In order to support the network connection, the control unit (106) comprises a network interface (e.g. network interface 130) through which the control unit (106) is capable of interfacing with network layers 136. The network layer (136) may have implemented therein basic network components for establishing network connection. In examples of Ethernet connection, the network layers (136) may have implemented therein the media-access-layer (MAC) and the physical layer (PHY) of the network protocol stack, based upon which the basic network connection can be established. Given the network interface (130) and the network layer (136), the control unit (106) can be connected to network 114. With the network connection, the control unit (106), as well as the display device, can thus be connected to other network-linked devices, such as display-network controller 101. In particular, the display-network controller (101) can be a control device capable of performing remote control and management of display device 106, which will be detailed afterwards.

As an alternative feature, the control unit (106) can be equipped with interfaces to other external devices. For example, the control unit (106) can be provided with a memory interface (128) for interfacing external memories (e.g. off-chip memories). The external memories can be any storage devices with suitable performance, such as low-latency or high latency memories, flash memories, and other volatile and non-volatile memories.

As another alternative feature, the control unit (106) can be provided with a connection to switch module 126. The switch module (126) delivers mode-switching instructions to the processor (or to other components) of control unit 106 for causing the display device to be operated in a particular operation mode (e.g. the normal display mode or the networking mode) and for causing the display device to be switched from one operation mode to another. The switch module (126) can alternatively provide other customized signals, such as Reset and Configure. With the Reset signal, the functional members (e.g. the processor, the network-interface, and/or the memory interface) can be forced to their default status or pre-determined customerized status.

The switch module (126) can be implemented as a software switch (e.g. a set of interrupt signals) or a hardware switch. In either instance, the switch module (126) can be on-chip (e.g. embedded in the circuit of control unit 106) or off-chip (e.g. separate from but is connected to the circuit of control unit 106).

In the normal operation mode, video/image data related to the videos/images to be displayed are stored in the on-chip low-latency memories, such as on-chip low-latency memories (118, 120, and 122) of on-chip memory set 124. The processor (116) processes the video/image data appropriately and passes the processed video/image data onto other functional modules, such as video data processing unit 108 or to the light valve (104).

In the networking mode, the control unit (106) uses at least one of the on-chip low-latency memories to store and execute at least a portion of a set of computer-executable codes for establishing the network connection (hereafter networking codes), such as networking codes for the network-stack-firmware. In one example, the networking codes can be stored substantially in one of the on-chip low-latency memories. In another example, the networking codes can be stored in multiple on-chip low-latency memories. Regardless of different storing schemes, the networking codes can be executed by processor 116 (or different processors if provided) at the same or different on-chip memories storing the networking codes. For example, the networking codes can be stored in one on-chip low-latency memory and executed in another on-chip low-latency memory by the processor. In the latter instance, the processor loads the networking codes from one on-chip memory (e.g. a flash memory) and executes the networking codes in another on-chip memory.

When the networking codes are to be stored in multiple on-chip low-latency memories, the on-chip memories for storing the networking codes can be selected dynamically or statically. In the dynamic selection scheme, the on-chip memories for storing networking codes are selected dynamically according to the dynamic utilization of the on-chip memories. For example when the display device is in the networking mode with disabled display function, substantially all of the on-chip low-latency memories can be selected for storing the networking codes. When the display device is in the networking mode with active display function (i.e. the display device can still be or are being used for displaying videos/images), the on-chip memories for storing the networking codes can be selected from those on-chip memories with lower utilization. In particular, multiple on-chip low-latency memories with low video/image data utilization can be selected for storing the networking codes.

In general, the display device can be operated in the normal display mode, the networking mode, or a combination thereof. Specifically, the display device can be operated at a mixed mode wherein both of the video/image display and networking functions are active such that the display device can perform both of the video/image display and network-communication simultaneously or concurrently, even though certain reduction in functionality may occur from such an arrangement.

The display device can be switched between different modes by a trigger event. The trigger event can be caused by the switch module (126) or one or more on-chip or off-chip functional members. For example, an on-chip or off-chip timing module (not shown) can be provided. The timing module can be configured to deliver a trigger signal to the control unit (106) upon expiration of a pre-determined period or upon expiration of a pre-determined period after completion of a specific operation.

In one example, the display device enters to the networking mode and communicates with the network (114) at scheduled time. During such a session, the display-network controller (101) schedules the next time (or a sequence of time) the display device is to enter the networking mode; and sends such schedule (or information on such schedule) to the display device. The display device enters to the networking modes according to the received schedule. Specifically, at each scheduled time, a trigger signal can be generated and received by the control unit (106). The control unit then causes the display device to be in the networking mode.

In another example, a networking schedule can be generated by a functional member that is connected to the control unit (106) other than the network, such as the switch module. Specifically, a pre-determined or a user-defined networking schedule can be generated. The trigger signal for switching the display device into the networking mode can be generated according to such networking schedule.

In yet another example, a trigger signal for switching the display device into the networking mode can be delivered to the control unit (106) upon expiration of a pre-determined period after the determination that there is substantially no video/image data to be displayed or processed, or when the video/image data flow into or output from the control unit (106) is below a pre-determined threshold. Upon receiving the trigger signal, the control unit (106) can be switched to the networking mode; and the normal display function may or may not be disabled.

In yet another example, a trigger signal for switching the display device into the normal display mode can be delivered to the control unit (106) upon expiration of a pre-determined period after the determination that the network-traffic between the display device and the network (114) is below a pre-determined threshold. Upon receiving this trigger signal, the display device can be switched to the normal display mode; while the networking function may or may not be disabled.

Instead of timing-based or schedule-based triggering, a trigger signal can be delivered from the display-network controller (101). Specifically, the display-network controller (101) can generate a trigger signal and delivers the trigger signal to the control unit (106) of the display device. The trigger signal can be an instruction for switching the display device to the normal display mode or to the full-networking mode (when the display device was in the minimal networking mode).

For example, the display device can maintain a minimal or reduced networking mode when it is powered on. The minimal networking mode is a mode wherein only the minimum specification(s) (e.g. only the physical layer and the media-access-control layer) of the network connection is activated. The processor (116) waits for certain networking commands on the network thereby reducing the utilization of the amount of on-chip low-latency memories. Upon receiving the specific networking commands from the internet (e.g. from the display-network controller 101), the display device enters the full-networking mode. During the minimal networking mode, the normal display mode may or may not be disabled.

In another example, a trigger signal can be generated by the switch module (126) as discussed above. The trigger signal from the switch module may be (even though not required) assigned with a higher priority than trigger signals from other functional members, such as from the display-network controller 101).

Figure 3:
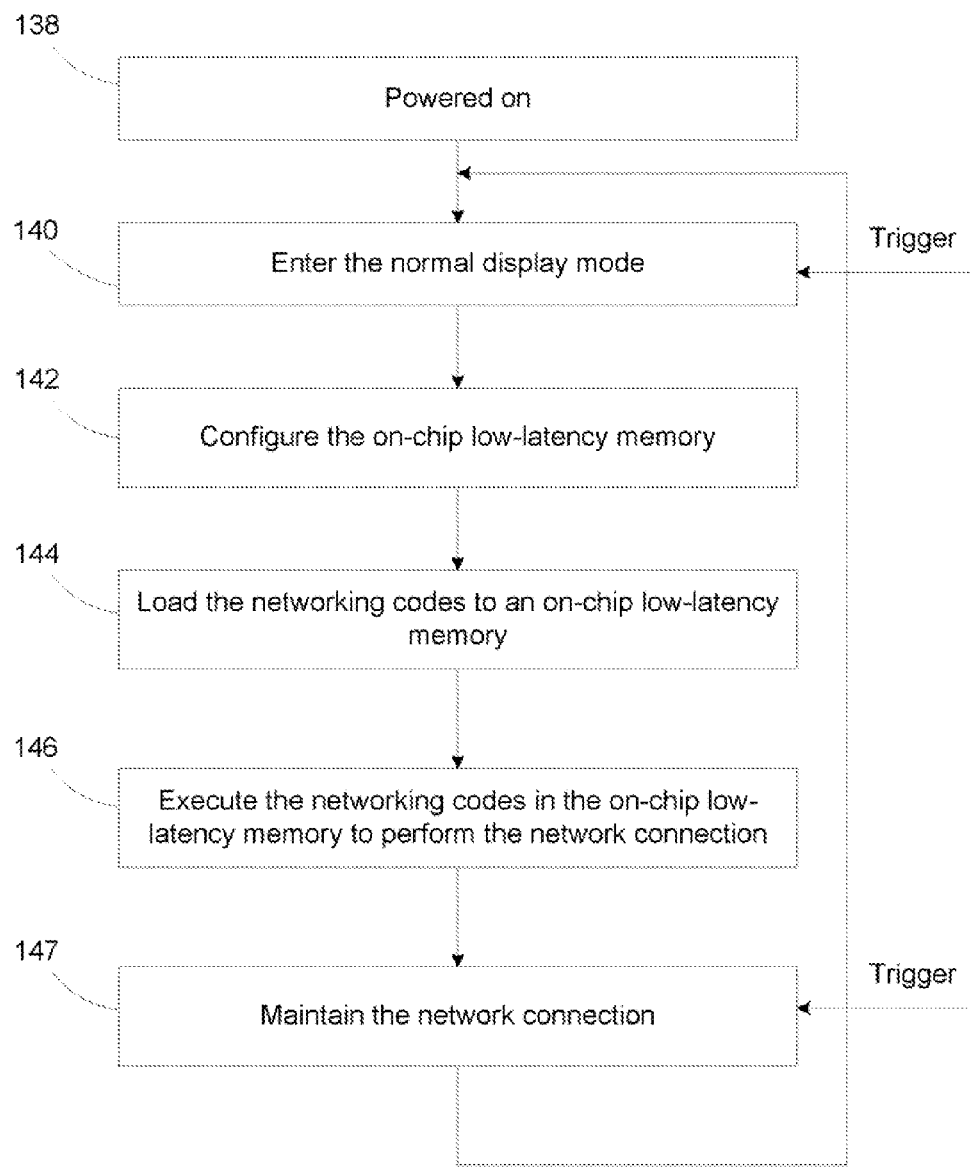
FIG. 3 is a flow chart showing the steps executed in an exemplary operation of the display device in FIG. 1.

For demonstration purpose, FIG. 3 shows a flow chart of an exemplary switching procedure of the display device. Referring to FIG. 3, the display device enters the normal display mode (step 140) when it is powered on (step 138). During the normal display mode, the display device listens to the trigger signal. When no trigger signal for switching mode is received, the display device maintains its normal display mode.

Upon receiving a trigger signal for switching to the networking mode, the control unit (106) configures its on-chip low-latency memory for storing networking codes (step 142). The memory configuration can be performed according to the dynamic memory allocation scheme or the static memory allocation scheme as discussed above, which will not be repeated herein. After the configuration, at least a portion of one of the on-chip low-latency memories used for storing video/image data in the normal display mode is allocated for storing at least a portion of the networking codes.

The processor (116 in FIG. 2) loads the networking codes into the allocated on-chip memory or memories, e.g. from a flash memory (step 144); and executes the networking codes (step 146), e.g. in the allocated memory or another memory or memories, to perform the network connection.

Once the network connection is established, the display device maintains its networking mode (step 147). It is noted that even though the network connection is established, the display device may or may not disable its display function. Specifically, the display device can still be configured to perform video/image display.

In the networking mode, the display device listens to the trigger signal. When no trigger signal is received, the display device maintains its networking mode. Upon receiving a trigger signal for switching to the normal display mode, the display device can return to the step of entering the normal display mode (step 140). Before returning to the normal display mode, the display device may perform a set of pre-determined tasks, such as securing the received data from the network, backing up the networking information, and configuring the on-chip low-latency memories (e.g. releasing the on-chip low-latency memories used during the networking mode).

Figure 4:
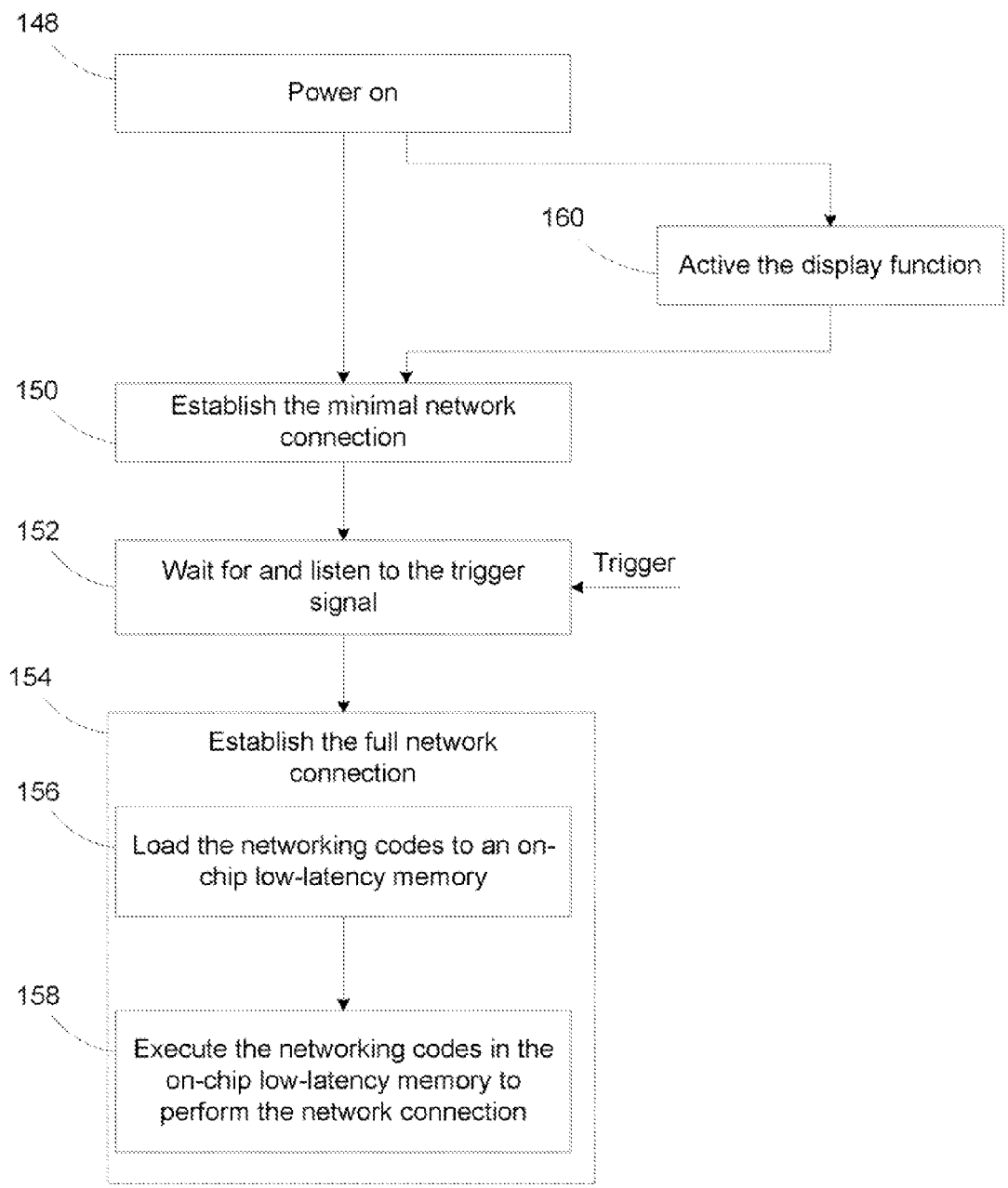
FIG. 4 is a flow chart showing the steps executed in another exemplary operation of the display device in FIG. 1.

For demonstration purposes, FIG. 4 is a flow chart of another exemplary switching procedure of the display device. Referring to FIG. 4, the display device may establish the minimal network connection (step 150) after it is powered on (step 148). After the display device is powered on (step 148) and before or after the step of establishing the minimal network connection (step 150), the display device can (though not required) activate its display function such that the display device can perform the normal video/image display operation.

The display device then waits for and listens to the trigger signal at the minimal networking mode (step 152). Upon receiving a trigger signal for switching to the full-networking mode, the display device establishes the full-network connection (step 154). The networking connection can be established by loading the networking codes into the allocated on-chip memory or memories, e.g. from a flash memory (step 156); and executing the networking codes (step 158), e.g. in the allocated memory or another memory or memories, to perform the network connection. In the example wherein the display device is performing the video/image display operation when the trigger for switching to the full-networking mode is received, the display device can alternatively perform a memory configuration step as step 142 in FIG. 3 prior to loading the networking codes.

Once the network connection is established, the display device maintains its full networking mode. It is noted that even though the full network connection is established, the display device may or may not disable its display function. Specifically, the display device can still be configured to perform video/image display.

In the full networking mode, the display device listens to the trigger signal. When no trigger signal is received, the display device maintains its full networking mode. Upon receiving a trigger signal for switching to the normal display mode, the display device can return to the step of entering the normal display mode. Before entering the normal display mode, the display device may perform a set of pre-determined tasks, such as securing the received data from the network, backing up the networking information, and configuring the on-chip low-latency memories (e.g. releasing the on-chip low-latency memories used during the networking mode).

As can be seen from the above discussion, the display device uses on-chip low-latency memories for both of the display operation and networking operation without sacrificing the performance of the desired video/image display operation. An extra network controller as used in existing display devices for performing the network connection my not be necessary in the display device of this disclosure. As such, the display device of this disclosure can have reduced bill-of-material (BOM) cost, original-equipment-manufacturing (OEM) cost, and/or original-design-manufacturing (ODM) cost than existing display devices with networking capability. Moreover, the display device of this disclosure enables more operation modes and provides much more flexible mode switching schemes than standard display devices having separate network controllers installed therein for network connection.

The display device as discussed above can be a member of various networks with different scales, connection methods, and architectures. For example, the display device can be a member of a personal-area-network (PAN), local-area-network (LAN), campus-area-network (CAN), metropolitan-area-network (MAN), wide-area-network (WAN), global-area-network (GAN), internetwork, intranet, extranet, internet, or a network of any combinations thereof. The network can be a network with an infrastructure or an ad hoc network. Depending upon the desired network connection method, the network can employ connections of Ethernet, optical fiber, wireless LAN, Home PAN, and/or power-line communication.

In a particular example, the display device as discussed above can be a member of a campus network or a corporate network. In a typical campus or corporate setup, a display device is often installed in each classroom of a campus or conference room. The display device with the networking capability as discussed above enables centralized remote control and management through one or more networks. For example, the display-network controller (101) as illustrated in FIG. 2 can be implemented in a network server; and the display devices with the networking capability can be installed in the classrooms or the conference rooms. The display devices and the network server can be connected through one or more networks. With this configuration and the networking capability of the display devices, a user can control and monitor each display device remotely.

Figure 5:
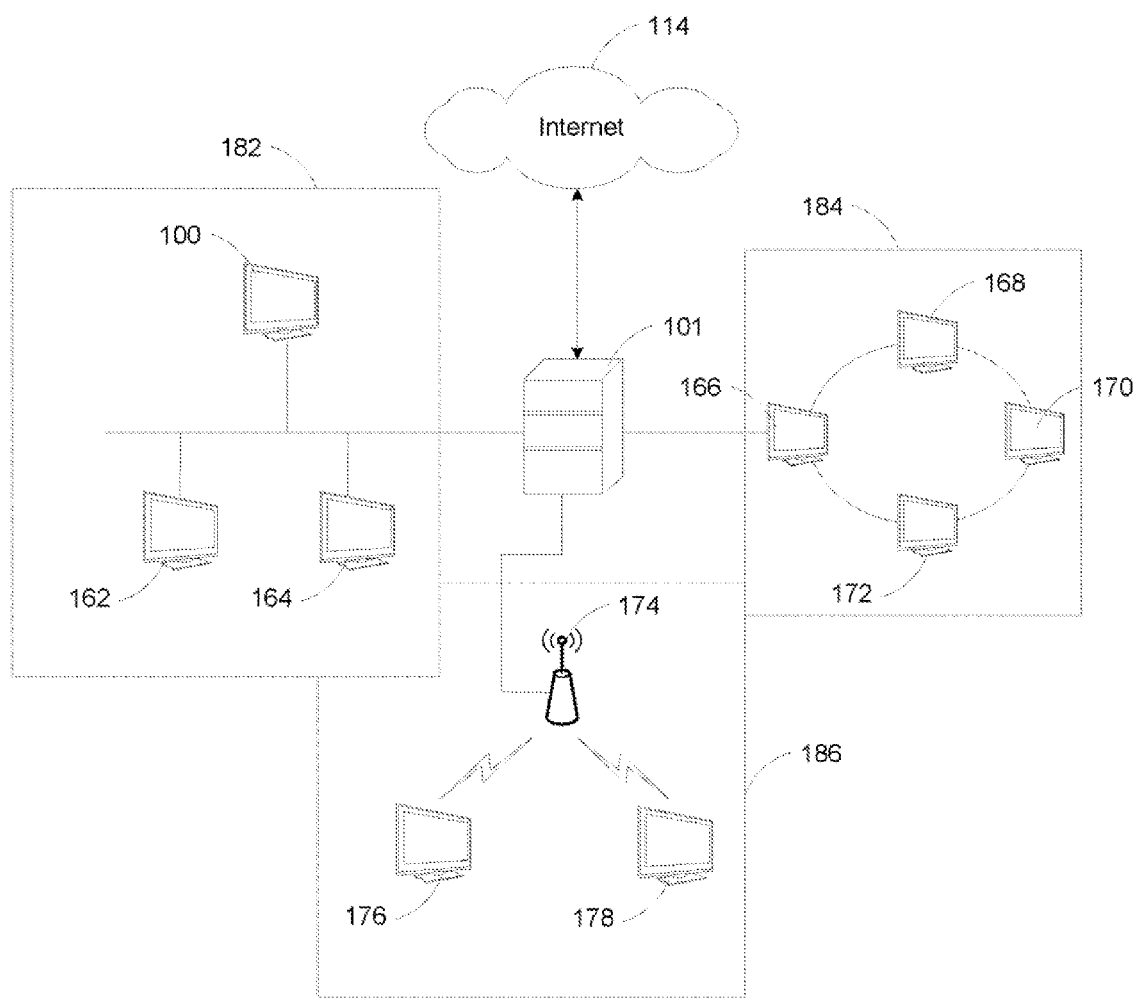
FIG. 5 diagrammatically illustrates an exemplary network having a plurality of networked display devices, in which the display system in FIG. 1 can be a member.

As a way of example, FIG. 5 diagrammatically illustrates an exemplary network in which the display device of this disclosure can be implemented. Referring to FIG. 5, the network comprises network server 101 that is connected to internet 114. Subnets 182, 184, and 186 are connected to the network server (101). Subnet 182 has a bus topology with display devices 100 and other terminal devices 162 and 164. The terminal devices can be the display devices of this disclosure or can be other devices, such as computers. Subnet 184 has a ring topology with terminal devices 166, 168, 170, and 172. Each one or all of the terminal devices of subnet 184 can be a display device of this disclosure or can be other devices, such as computers. Subnet 186 is a wireless subnet having an access point (174) and terminal devices 176 and 178. The terminal devices 176 and 178 each can be the display device of this disclosure or can be other devices, such as computers.

It will be appreciated by those of skilled in the art that a new and useful display device with embedded networking capability has been described herein. In view of the many possible embodiments, however, it should be recognized that the embodiments described herein with respect to the drawing figures are meant to be illustrative only and should not be taken as limiting the scope of what is claimed. Those of skill in the art will recognize that the illustrated embodiments can be modified in arrangement and detail. Therefore, the devices and methods as described herein contemplate all such embodiments as may come within the scope of the following claims and equivalents thereof.

We claim:

1. A method, comprising:
providing a display device having an integrated circuit chip including a flash memory storing software code, a processor for executing the software code, and a video memory for storing real-time video/image data;
operating the display device in a normal display mode by storing real-time video/image data in the video memory and displaying images using the data stored in the video memory;
switching the display device from the normal display mode to a networking mode;
operating the display device in the networking mode by loading executable networking software code from the flash memory into memory locations of the video memory used for storing at least part of the real-time video/image data in the normal display mode, and executing the networking software code from the video memory using the processor for establishing a network connection between the display device and a network; and
switching the display device from the networking mode back to the normal display mode, and loading real-time video/image data in the video memory including into the memory locations used for loading the networking software code in the networking mode;
wherein switching the display device back to the normal display mode includes the execution of predetermined tasks; and
wherein the predetermined tasks include securing data received over the network connection, backing up network information, and releasing the memory locations in the video memory used for loading the networking software code.

2. The method of claim 1, wherein switching from the normal display mode to the networking mode or back is in response to a trigger which occurs upon reaching a predetermined time.

3. The method of claim 2, wherein the predetermined time is a time set by information received over the network connection.

4. The method of claim 2, wherein the predetermined time is a time set by expiration of a predetermined time period.

5. The method of claim 1, wherein switching from the normal display mode to the networking mode or back is in response to a trigger which occurs upon expiration of a specific operation.

6. The method of claim 1, wherein the display device is provided including a light valve; and wherein images are displayed by using the light valve to modulate incident light based upon the stored real-time video/image data.

7. A method, comprising:
providing a display device having an integrated circuit chip including a flash memory storing software code, a processor for executing the software code, and a video memory for storing real-time video/image data;
operating the display device in a normal display mode by storing real-time video/image data in the video memory and displaying images using the data stored in the video memory;
switching the display device from the normal display mode to a networking mode;
operating the display device in the networking mode by loading executable networking software code from the flash memory into memory locations of the video memory used for storing at least part of the real-time video/image data in the normal display mode, and executing the networking software code from the video memory using the processor for establishing a network connection between the display device and a network; and
switching the display device from the networking mode back to the normal display mode, and loading real-time video/image data in the video memory including into the memory locations used for loading the networking software code in the networking mode;
wherein switching from the networking mode to the normal display mode is in response to a network traffic rate between the display device and the network dropping below a predetermined threshold.

8. A method, comprising:
providing a display device having an integrated circuit chip including a flash memory storing software code, a processor for executing the software code, and a video memory for storing real-time video/image data;
operating the display device in a normal display mode by storing real-time video/image data in the video memory and displaying images using the data stored in the video memory;
switching the display device from the normal display mode to a networking mode; and
operating the display device in the networking mode by loading executable networking software code from the flash memory into memory locations of the video memory used for storing at least part of the real-time video/image data in the normal display mode, and executing the networking software code from the video memory using the processor for establishing a network connection between the display device and a network;
wherein switching from the normal display mode to the networking mode is in response to a flow of the video/image data dropping below a predetermined threshold.

9. A method, comprising:
providing a display device having an integrated circuit chip including a flash memory storing software code, a processor for executing the software code, and a video memory for storing real-time video/image data;
operating the display device in a normal display mode by storing real-time video/image data in the video memory and displaying images using the data stored in the video memory;
switching the display device from the normal display mode to a networking mode; and
operating the display device in the networking mode by loading executable networking software code from the flash memory into memory locations of the video memory used for storing at least part of the real-time video/image data in the normal display mode, and executing the networking software code from the video memory using the processor for establishing a network connection between the display device and a network;
wherein switching the display device from the normal display mode to the networking mode comprises switching the display device to a selected one of a networking mode with a disabled display function or a networking mode with an active display function;

wherein, if the networking mode with the disabled display function is selected, the display device is operated by loading executable networking software code from the flash memory into substantially all memory locations of the video memory used for storing the real-time video/image data in the normal display mode; and wherein, if the networking mode with the active display function is selected, the display device is operated by loading executable networking software code from the flash memory into only a portion of the memory locations of the video memory used for storing the real-time video/image data in the normal display mode, with the display device continuing to use other memory locations of the video memory for storing real time video/image data in the video memory and displaying images using the data stored in the other memory locations.

10. The method of claim 9, wherein the display device is provided including a light valve; and wherein images are displayed by using the light valve to modulate incident light based upon the stored real-time video/image data.

11. A method, comprising:

providing a display device having an integrated circuit chip including a flash memory storing software code, a processor for executing the software code, and a video memory for storing real-time video/image data;

operating the display device in a display mode or a networking mode;

wherein, in the display mode, the display device is operated by storing real-time video/image data in the video memory and displaying images using the data stored in the video memory; and wherein, in the networking mode, the display device is operated by executing networking software code from the video memory using the processor for establishing a network connection between the display device and a network; and switching the display device from the display mode to the networking mode, or from the networking mode to the display mode;

wherein, when the display device is switched from the display mode to the networking mode, executable networking software code is loaded from the flash memory into memory locations of the video memory used for storing at least part of the real-time video/image data in the display mode;

wherein, when the display device is switched from the networking mode to the display mode, real-time video/image data is loaded into the video memory including into the memory locations used for loading the networking software code in switching to the networking mode; and wherein switching the display device from the networking mode to the display mode comprises the execution of predetermined tasks including securing data received over the network connection, backing up network information, and releasing the memory locations in the video memory used for loading the networking software code.

12. A method, comprising:

providing a display device having an integrated circuit chip including a flash memory storing software code, a processor for executing the software code, and a video memory for storing real-time video/image data;

operating the display device in a display mode or a networking mode;

wherein, in the display mode, the display device is operated by storing real-time video/image data in the video memory and displaying images using the data stored in the video memory; and wherein, in the networking mode, the display device is operated by executing networking software code from the video memory using the processor for establishing a network connection between the display device and a network; and switching the display device from the display mode to the networking mode, or from the networking mode to the display mode;

wherein, when the display device is switched from the display mode to the networking mode, executable networking software code is loaded from the flash memory into memory locations of the video memory used for storing at least part of the real-time video/image data in the display mode;

wherein, when the display device is switched from the networking mode to the display mode, real-time video/image data is loaded into the video memory including into the memory locations used for loading the networking software code in switching to the networking mode;

wherein switching the display device from the display mode to the networking mode comprises switching the display device to a selected one of a networking mode with a disabled display function or a networking mode with an active display function;

wherein, if the networking mode with the disabled display function is selected, the display device is operated by loading executable networking software code from the flash memory into substantially all memory locations of the video memory used for storing the real-time video/image data in the normal display mode; and wherein, if the networking mode with the active display function is selected, the display device is operated by loading executable networking software code from the flash memory into only a portion of the memory locations of the video memory used for storing the real-time video/image data in the display mode, with the display device continuing to use other memory locations of the video memory for storing real time video/image data in the video memory and displaying images using the data stored in the other memory locations.

13. A method, comprising:

providing a display device having an integrated circuit chip including a flash memory storing software code, a processor for executing the software code, and a video memory for storing real-time video/image data;

operating the display device in a display mode or a networking mode;

wherein, in the display mode, the display device is operated by storing real-time video/image data in the video memory and displaying images using the data stored in the video memory; and wherein, in the networking mode, the display device is operated by executing networking software code from the video memory using the processor for establishing a network connection between the display device and a network; and switching the display device from the display mode to the networking mode, or from the networking mode to the display mode;
  wherein, when the display device is switched from the display mode to the networking mode, executable networking software code is loaded from the flash memory into memory locations of the video memory used for storing at least part of the real-time video/image data in the display mode;
  wherein, when the display device is switched from the networking mode to the display mode, real-time video/image data is loaded into the video memory including into the memory locations used for loading the networking software code in switching to the networking mode; and
wherein switching from the networking mode to the display mode occurs in response to a trigger signal that occurs when a network traffic rate between the display device and the network dropping below a predetermined threshold.

14. A method, comprising:
providing a display device having an integrated circuit chip including a flash memory storing software code, a processor for executing the software code, and a video memory for storing real-time video/image data;
operating the display device in a display mode or a networking mode;
  wherein, in the display mode, the display device is operated by storing real-time video/image data in the video memory and displaying images using the data stored in the video memory; and
  wherein, in the networking mode, the display device is operated by executing networking software code from the video memory using the processor for establishing a network connection between the display device and a network; and
switching the display device from the display mode to the networking mode, or from the networking mode to the display mode;
  wherein, when the display device is switched from the display mode to the networking mode, executable networking software code is loaded from the flash memory into memory locations of the video memory used for storing at least part of the real-time video/image data in the display mode;
  wherein, when the display device is switched from the networking mode to the display mode, real-time video/image data is loaded into the video memory including into the memory locations used for loading the networking software code in switching to the networking mode; and
  wherein switching from the display mode to the networking mode is in response to a trigger signal that occurs when a flow of the video/image data dropping below a predetermined threshold.

* * * * *